(12) United States Patent
Daughtry et al.

(10) Patent No.: US 8,572,118 B2
(45) Date of Patent: *Oct. 29, 2013

(54) COMPUTER METHOD AND APPARATUS OF INFORMATION MANAGEMENT AND NAVIGATION

(75) Inventors: Chenita D. Daughtry, Roxbury, MA (US); Angelo Lynn, Boston, MA (US); Ebubechukwu I. Okafor, Mattapan, MA (US); Latoya Sankey, Malden, MA (US); Razeyah R. Stephen, Marlboro, MA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/253,949

(22) Filed: Oct. 5, 2011

(65) Prior Publication Data
US 2012/0030239 A1 Feb. 2, 2012

Related U.S. Application Data

(63) Continuation of application No. 12/338,836, filed on Dec. 18, 2008, now Pat. No. 8,099,430.

(51) Int. Cl.
*G06F 17/30* (2006.01)
(52) U.S. Cl.
USPC ........................................................ 707/777
(58) Field of Classification Search
USPC .......... 707/707, 706, 708, 709, 777, 736, 737
See application file for complete search history.

(56) References Cited

U.S. PATENT DOCUMENTS

| 6,487,495 | B1 | 11/2002 | Gale et al. |
| 6,725,227 | B1 | 4/2004 | Li |
| 7,266,548 | B2 | 9/2007 | Weare |
| 7,281,042 | B2 | 10/2007 | Hsu et al. |
| 2003/0016238 | A1* | 1/2003 | Sullivan et al. ............... 345/705 |
| 2004/0181525 | A1* | 9/2004 | Itzhak et al. ...................... 707/5 |
| 2005/0080781 | A1* | 4/2005 | Ryan et al. ........................ 707/5 |
| 2006/0200556 | A1* | 9/2006 | Brave et al. ................... 709/224 |
| 2006/0277208 | A1* | 12/2006 | Starbuck et al. .............. 707/102 |

(Continued)

OTHER PUBLICATIONS

Alam, H., el al., "Automatic Semantic Grouping in a Spoken Language User Interface Toolkit," BCL Technologies Inc., Santa Clara, CA, Proceedings of the 19th International Conference on Computational Linguistics, Howard International House, Taipei, Taiwan, Aug. 26-30, 2002.

(Continued)

*Primary Examiner* — Anteneh Girma
*Assistant Examiner* — Fatima Mina
(74) *Attorney, Agent, or Firm* — Hamilton, Brook, Smith & Reynolds, P.C.

(57) ABSTRACT

Computer method and apparatus manages and navigates computer implemented information. A first source information and second source information are related as parent-child information. Keywords are extracted from the first and second source information and are used to relate second source information to the first source information. This produces dynamic sets or groupings of second source information related by keywords. Display of a listing of the keywords enables user navigation of the information especially according to the groupings of second source information.

18 Claims, 5 Drawing Sheets

(56) References Cited

U.S. PATENT DOCUMENTS

| | | | |
|---|---|---|---|
| 2007/0006132 A1 | 1/2007 | Weinstein et al. | |
| 2007/0100915 A1 | 5/2007 | Rose et al. | |
| 2007/0219986 A1* | 9/2007 | Egozi | 707/5 |
| 2007/0288416 A1 | 12/2007 | Ferguson et al. | |
| 2009/0077124 A1* | 3/2009 | Spivack et al. | 707/103 Y |
| 2010/0161599 A1 | 6/2010 | Daughtry et al. | |
| 2011/0082853 A1* | 4/2011 | Galai et al. | 707/709 |

OTHER PUBLICATIONS

Dragut, E.C., et al., "Meaningful Labeling of Integrated Query Interfaces," *VLDB* '06:679-690 (Sep. 2006).

Hu, M, et al., "Comments-Oriented Blog Summarization by Sentence Extraction," *CIKM* '07:901-904 (Nov. 2007).

Schuth, A., et al., "Extracting the Discussion Structure in Comments on News-Articles," *WIDM* '07:97-104 (Nov. 2007).

* cited by examiner

FIG. 1A

Mass Campus Amenities Forum w3

| WikiCentral Home |
|---|
| Mass Campus Amenities Forum |
| News |
| Home |
| ATM Use Survey |
| Retired Home Page |
| Sample cafeteria pictures |
| Pages |
| Attachments |
| Templates |

WikiCentral Home > Mass Campus Amenities Forum > Retired Home Page

Welcome to the Mass Campus Amenities Forum

Campus Amenities Forum

The Campus Amenities Forum has been created to ensure there is cross functional and site representation on the Project Team. The Forums will be used to solicit input and recommendations for consideration during the Design Phase and throughout the course of the project.

The Campus Amenities Forum will address items meant to make the campus a place you want to come to work and enjoy a true community feeling. The Forum members will be soliciting feed back on areas such as fitness center requirements, dinning services, recreation sports leagues and various on campus clubs.

Community Forum representatives will be a communication channel and champions for their stockholders.

YOUR INPUT IS IMPORTANT!!!

Please help us gather information on what IBMers would like to see within the new campus.

| What is your top amenity with the new MA campus? | Choose |
|---|---|
| Resources for bike commuters | ⊘ |
| Freezer storage for food | ⊘ |
| ATM or branch office of a credit union | ⊘ |
| Smoking areas located away from the building entrance | ⊘ |
| Outdoor sports areas | ⊘ |

132 comments | Add comment

Generated keywords
ATM (15)
Bike (25)
Campus (6)
Club (3)
Food (10)
Freezer (22)
Outdoor (45)
Smoking (4)
Sports (30)
Storage (33)

...a designated covered area outside for smokers would be ideal.
Posted by Kevin    at Sep. 05, 2007 10:56 | Permalink | Reply To This We could use a number of disposal containers at or near the designated smoking areas to keep appearances..
Posted by Scott    at Sep. 05, 2007 10:59 | Permalink | Reply To This My former employer... had covered picnic areas for smoking ...
Posted by Robert    at Sep. 05, 2007 13:18 | Permalink | Reply To This Are there minimum requirements for accommodating smoking? How far away from building entrance is being considered? ...

COMPUTER METHOD AND APPARATUS OF INFORMATION MANAGEMENT AND NAVIGATION

RELATED APPLICATION(S)

This application is a continuation of U.S. application Ser. No. 12/338,836, filed Dec. 18, 2008.

The entire teachings of the above application are incorporated herein by reference.

BACKGROUND

In a global computer network application that allows product reviews (i.e., CNET.com) or responses to content in blogs, wikis (collection of collaborative content, generally), Notes discussion databases or Activities systems, it is sometimes difficult to find the most useful and relevant information in the responses.

For example on product review sites like CNET.com, for buying decisions a person might want to see what user opinions have been posted about a product (e.g., cell phone). The person would be most interested in opinions relevant to the features listed for the product mentioned in a main review for example battery-life, reception, weight, display/screen size, camera resolution, GPS support, etc. It becomes difficult to search through the comments especially when a posted opinion is not even related the main review.

BRIEF SUMMARY

The present invention addresses the short comings of prior art. In particular, embodiments of the present invention dynamically generate keywords that are common between parent-child sources and effectively form links from the parent source to multiple pertinent child sources, such as, the posted opinions in the example mentioned above in a product review site like CNET.com. A listing of the keywords may be employed in or by a User Interface (UI) to display indications of the child sources (e.g., posted opinions, etc.) grouped by keyword. This enables a person to easily see logical groupings or subsets of child sources and an indicator of what is being commented about in the subset, without having to manually search child source content or illogically sort through the child sources.

The core idea of the present invention involves taking keywords from the parent (i.e., blog document) source and relating the keywords from it to child sources (i.e., posted comments). In a preferred embodiment, keywords are developed utilizing a knowledge management service such as WordNet or the like, whose functions perform the following (taken from Wikipedia):

"WordNet is a semantic lexicon for the English language. It groups English words into sets of synonyms called synsets, provides short, general definitions, and records the various semantic relations between these synonym sets."

Metrics from tools like WordNet are used to analyze the parent source and create a taxonomy of keywords that can be used in the UI to help users easily search child sources of the parent source. From this generated keyword list, a UI can be implemented for displaying the keywords/taxonomy as a tag cloud, where if one keyword or tag is selected all child sources relating to the selected keyword or tag are displayed. The only keywords or tags displayed in the tag cloud are those mentioned in the child sources. As more child sources are created other keywords can dynamically surface in the UI if not already displayed.

Accordingly the generated keywords of the present invention enable sorting, categorizing and indexing of the child sources.

In a preferred embodiment, computer information navigation and/or management apparatus and method include:

receiving a first source of information and one or more second sources of information, each second source having a parent-child relationship with the first source as parent;

automatically extracting keywords from the first source and each of the second sources in a manner such that, for each extracted keyword, the keyword correlates (relates or otherwise corresponds) the first source and at least one second source, resulting in a respective set of second sources for each keyword; and displaying to a user a listing of the keywords resulting from the automatic extracting. The displayed listing enables the user to navigate and/or manage the one or more second sources. The different keywords in the displayed listing effectively reference the different respective sets of second sources.

In accordance with one aspect of the present invention, the first source is any of:
a wiki, a blog, computer network printable content, written material in a computer, and text-like communications in a computer.

Each of the second sources may be any of computer implemented: comments, responses, notes, and text-based messages.

In some embodiments, the automatic extracting utilizes a semantic lexicon tool. In other embodiments, the step of automatically extracting includes:

extracting initial keywords from the first source;

forming an initial taxonomy from the extracted initial keywords;

detecting in the second sources words that match the initial taxonomy but that do not duplicate the extracted initial keywords of the first source; and combining the extracted initial keywords from the first source and the detected words from the second sources, said combining forming the listing of keywords.

In yet other embodiments, the step of automatically extracting keywords includes:

extracting from a second source, nouns relating to nouns from the first source; and eliminating extracted nouns that are duplicates of extracted keywords from the first source. The remaining extracted nouns are keywords that correlate the first source and the second source.

The displayed listing may be any of a tag cloud, a taxonomy, and an ordered list. Further in one embodiment, for each keyword in the displayed listing, the keyword is linked to its respective set of second sources and enables display of the respective set of the second sources upon user selection of the keyword.

Preferably, the displayed listing of the keywords includes, for each keyword, an indication of number of second sources in the respective set of second sources of the keyword.

In one embodiment, the first source and the one or more second sources are received from a collaborative application in a global computer network. The step of automatically extracting keywords is continually performed to update the displayed listing. The step of displaying includes displaying the updated listing of keywords to end users of the collaborative application.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1a-1b are schematic views of an online collaborative application and a user interface embodying the present invention and displaying a list of keywords that are (i) mentioned in child sources (comments) of a parent topic and (ii) in common with the parent.

DETAILED DESCRIPTION

Shown in FIG. 1a is an example of a wiki about amenities for a new campus including 132 comments about the topic. Generally, a wiki is a collaborative global computer network site or collection of online content designed to enable network users to contribute or modify content. The basic wiki shown and its operations including for example "Add Comment" 39 (mentioned below) are implemented by known techniques. In the illustrated screen view 13, the basic wiki includes a main topic 11 and comments 19. The main topic 11 forms the content of the first (upper) half of the screen view 13 and a plurality of comments 19 forms the content of the lower half of the screen view 13. The present invention add to the basic wiki as follows.

From the topic 11 and comments 19, a keyword engine 21 (detailed later) or the like of the present invention, automatically generates a list of keywords (in the box 15) using the methods described below. In one embodiment, the generated list 15 of keywords is displayed in alphabetical order of keywords. In another embodiment, the generated list 15 of keywords is a taxonomy or hierarchy of keywords. Other arrangements and/or display order of keyword lists 15 are suitable.

In the illustrated example, the listing 15 of keywords serves as a display of logical groupings or subsets of comments, and each listed keyword is an indicator of what is being commented about in the respective subset. A respective numerical indicator (shown parenthetically in FIGS. 1a and 1b) next to each keyword entry 17 in the listing 15 indicates the number of comments having that keyword. Hyperlink technology enables each keyword entry 17 to link to its corresponding comments upon user command (user interaction).

For example, a user who wants to add comments to the illustrated wiki, may want to find out what people have already commented on with regard to "smoking," before operating the "Add Comment" feature 39. The user clicks on or otherwise selects the "Smoking (4)" link 17 (that is, entry 17 in generated keyword list 15) to see four comments that have discussed this keyword ("smoking"). The illustrated user interface 33 is responsive and updates the screen view 13 by displaying the four user selected comments 19a, b, c, d on smoking as shown in FIG. 1b. User selection of the other entries 17a . . . n in keyword list 15 causes similar display of respective groups of comments 19.

Figure 2:
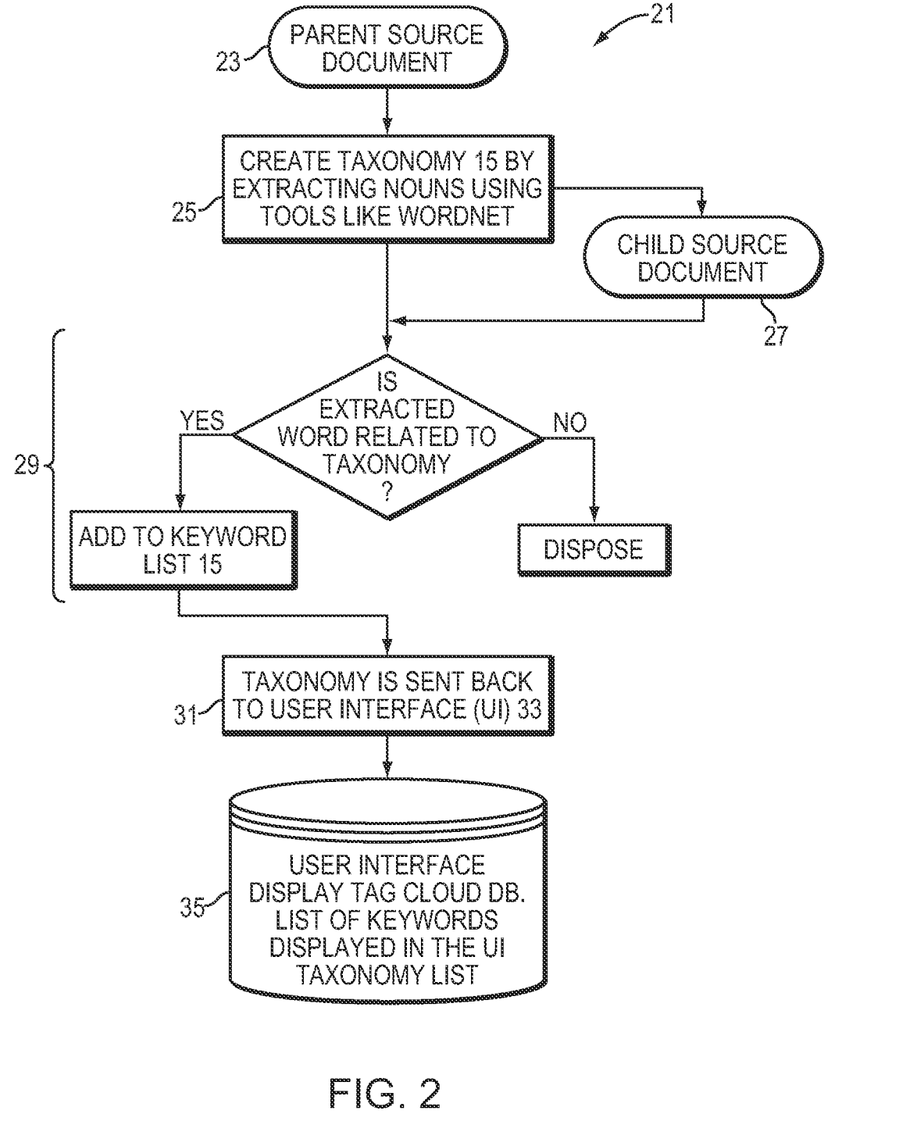
FIG. 2 is a flow diagram of an embodiment of the present invention.

Shown in FIG. 2 is a process flow diagram of one embodiment of the present invention. Initial input is a parent source document 23 (for example the wiki topic 11 in FIG. 1a). A keyword engine 21 first preferably looks at the title of the parent source 23 since a title generally describes what subject the source 23 is about. Using semantic lexicon tools like WordNet, keyword engine 21 at step 25 extracts nouns from the title of the parent source document 23. For each of the top relations (between synonym sets) of the extracted nouns returned from WordNet, keyword engine 21 (step 25) adds the extracted nouns to keyword list or taxonomy 15.

Next, keyword engine 21 (step 25) looks at the body of the parent source document 23 and extracts nouns relating to nouns from the parent title. This is accomplished again by using semantic lexicon tools or knowledge management services like WordNet or similar. In turn, keyword engine 21 takes the top relations returned from WordNet and adds these extracted nouns to keyword list/taxonomy 15.

Subsequently, as child sources 27 (comments 19 in the FIGS. 1a-1b example) come into being, keyword engine 21 determines or otherwise recognizes the parent-child relationship between initial source document 23 and its child documents 27. This is accomplished based on user input or action (such as operating the 'Add Comment" command 39 in the FIGS. 1a-1b example). Also the computer network application supporting the parent and child sources/documents 23, 27 and supporting the operation to create child documents 27 (e.g., the "Add Comments" command 39 of the FIG. 1a-1b example) tracks and maintains the parent-child relationships. Keyword engine 21 may be coupled to receive this relationship data from the network application.

Next for each child source 27 of parent source 23, the keyword engine 21 at step 29 looks at the child source 27 to detect words that could match the taxonomy that are not already in the keyword list 15. This is accomplished by:
 (i) extracting nouns relating to nouns from the parent 23 title using semantic lexicon/knowledge management tools like WordNet,
 (ii) keeping top relations of the extracted nouns returned from WordNet and eliminating the rest,
 (iii) comparing these extracted nouns with nouns already in the keyword list 15,
 (iv) eliminating extracted nouns that are duplicates of nouns found in the keyword list 15, and
 (v) adding the resulting extracted nouns to the keyword list 15.

Next step 31 and supporting data 35 enable final formed (and continually updated with each new child source 27) keyword list 15 for display and operation in the User Interface (UI) 33. The user interface 33 display of formed keyword list 15 may be implemented as a tag cloud, a listing (as in box 15 of the FIG. 1a-1b example), a taxonomy list or other suitable display feature/element. User operation and function of the displayed list 15 of keywords is then as described in the example of FIGS. 1a-1b and supported by UI display data 35, common linking techniques and the like.

Figure 3:
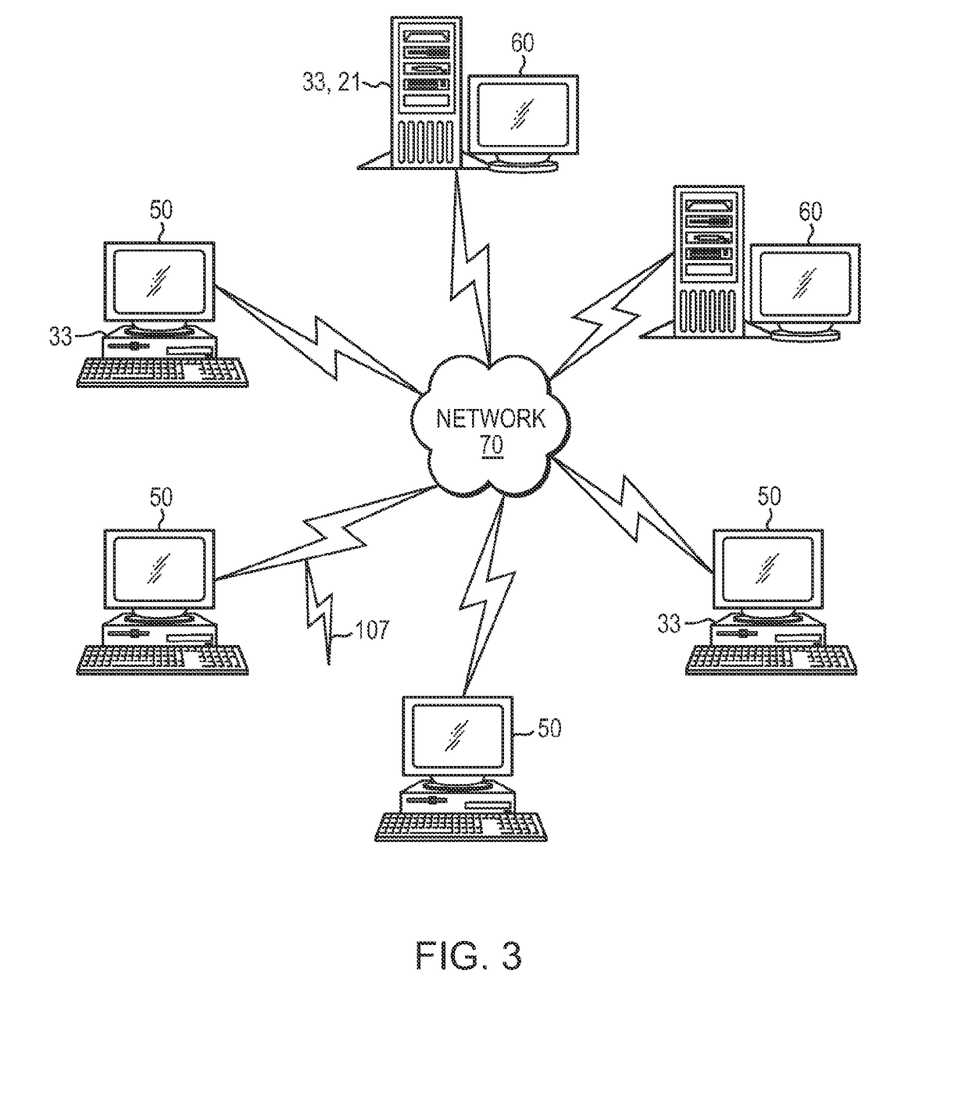
FIG. 3 is a schematic view of a computer network environment in which embodiments of the present invention may be deployed.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
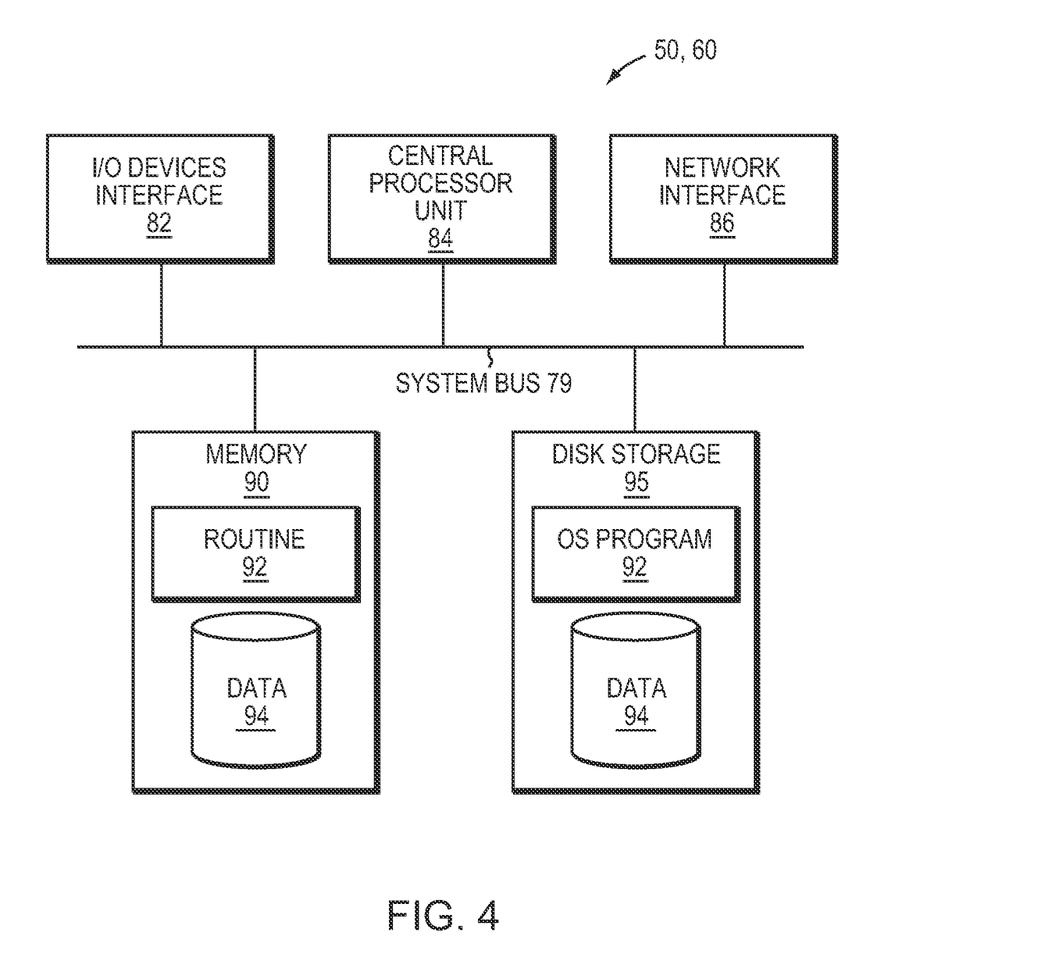
FIG. 4 is a block diagram of a computer node in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., keyword engine 21, keyword list 15, user interface 33 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

According to the foregoing, the present invention deploys a parent to child relationship (between sources/documents, comments, other content, etc.) to build a keyword list. Embodiments use multiple sources (having a parent-child relationship) to dynamically generate keywords that link multiple child sources to the parent, different keywords linking different subsets (groupings) of child sources to the parent. Each keyword effectively correlates between or otherwise relates a parent source and one or more child sources. Thus embodiments enable the surfacing (determination or identification) of keywords for parent-child relationships in online documents such as wikis, blogs, requests/comments, etc. Keywords are dynamically generated from the parent document and displayed if used in the child document (by using a common word-extraction tool such as WordNet in one embodiment). Using these keywords (e.g., in a keyword listing hyperlinking each keyword to respective child documents), users are able to quickly retrieve and see child documents related to a user selected one of the keywords.

In another aspect, the present invention pertains to dynamically grouping related comments about a document/source so that the reader can access the most relevant group of data pertaining to his interests. This is accomplished by embodiments extracting keywords from the parent source/document based on the title and subject matter of the parent, and extracting further keywords from child sources/documents that relate to the title and subject matter of the parent. Each extracted keyword results in a grouping or set of child sources/documents (related to each other by keyword). As a result, more precise keywords are achieved and allow a user to quickly find/retrieve child documents (e.g. comments) related to these keywords. Thus key subject matter of the parent is shown (made available to the user) in child documents instead of frivolous child documents/comments.

As used herein the term "document" (parent or child) means any online or computer network printable content, written material or text-like communication without regard to format, length, or structure. Thus a "document" may be any of various computer implemented textual works in the range of a journal paper, formal article, or essay, to comments, responses, notes, and text-based messages. Examples of such "documents" as used herein include webpage/screen view contents, comments, blog entries, wiki postings, or other authored pieces or text composed by a user in a computer network.

What is claimed is:

1. A computer program product for managing information comprising:
    a non-transitory computer readable storage medium having computer usable program code embodied therewith, the computer useable program code including:
    computer useable program code configured to:
    receive a first computer source of information and one or more second computer sources of information, each second computer source having a parent-child relationship with the first computer source;
    automatically extract keywords from the first computer source and each of the second computer sources in a manner employing knowledge management including knowledge management services or a semantic lexicon tool, such that, for each extracted keyword, the extracted keyword correlates the first computer source and at least one second computer source, resulting in a respective set of second computer sources for each extracted keyword and resulting in precise keywords enhancing retrieval of second computer sources of information, and wherein for each extracted keyword, knowledge management automatically records semantic relationships between the extracted keyword and its respective set of second sources; wherein automatically extracting includes:

extracting initial keywords from the first source;

forming an initial taxonomy from the extracted initial keywords;

detecting in the second sources words that match the initial taxonomy but that do not duplicate the extracted initial keywords of the first source; and combining the extracted initial keywords from the first source and the detected words from the second sources, said combining forming the listing of keyword; and display through a computer output device to a user a listing of the extracted keywords resulting from the automatic extracting and from the automatically recorded semantic relationships, the displayed listing enabling the user to manage the one or more second computer sources, different keywords in the displayed listing effectively referencing the different respective sets of second computer sources, and the different respective sets of second computer sources having subject matter of the first computer source of information shown to the user.

2. A computer program product as claimed in claim 1, wherein the displayed listing further enables the user to navigate the one or more second computer sources.

3. A computer method of navigating information comprising:

receiving a first source of information and one or more second sources of information, each second source having a parent-child relationship with the first source, the first source being the parent;

automatically extracting keywords from the first source and each of the second sources in a manner employing knowledge management including knowledge management services or a semantic lexicon tool, such that, for each extracted keyword, the keyword correlates the first source and at least one second source, resulting in a respective set of second sources for each extracted keyword and resulting in precise keywords that enhance retrieval of second sources of information, and wherein for each extracted keyword, knowledge management automatically records semantic relationships between the extracted keyword and its respective set of second sources; and displaying to a user a listing of the keywords resulting from the automatic extracting and from the automatically recorded semantic relationships, the displayed listing enabling the user to navigate the one or more second sources, different keywords in the displayed listing effectively referencing the different respective sets of second sources and the different respective sets of second sources having subject matter of the first source of information shown to the user; wherein automatically extracting includes:

extracting initial keywords from the first source;

forming an initial taxonomy from the extracted initial keywords;

detecting in the second sources words that match the initial taxonomy but that do not duplicate the extracted initial keywords of the first source; and combining the extracted initial keywords from the first source and the detected words from the second sources, said combining forming the listing of keyword.

4. A method as claimed in claim 3 wherein the first source is any of:

a wiki, a blog, computer network printable content, written material in a computer, and text-like communications in a computer.

5. A method as claimed in claim 3 wherein each of the second sources is any of computer implemented: comments, responses, notes, and text-based messages.

6. A method as claimed in claim 3 wherein the displayed listing is any of a tag cloud, a taxonomy, and an ordered list.

7. A method as claimed in claim 6 further comprising enabling display of the respective set of the second sources upon user selection of the keyword.

8. A method as claimed in claim 3 wherein the displayed listing of the keywords includes, for each keyword, an indication of number of second sources in the respective set of second sources of the keyword.

9. A method as claimed in claim 3 wherein:

the first source and the one or more second sources are received from a collaborative application in a global computer network;

the step of automatically extracting keywords is continually performed to update the displayed listing; and the step of displaying includes displaying the updated listing of keywords to end users of the collaborative application.

10. A method as claimed in claim 3 wherein the step of automatically extracting keywords includes:

extracting from a second source, nouns relating to nouns from the first source; and eliminating extracted nouns that are duplicates of extracted keywords from the first source, remaining extracted nouns being keywords that correlate the first source and the second source.

11. A computer information navigation system, comprising:

in a computer memory:
(i) a first source of information; and
(ii) one or more second sources of information, information from each second source having a parent-child relationship with the first source information, the first source information being parent information;

in a processor coupled for communication with the computer memory, a keyword engine executed by the processor and responsive to the first and second sources of information, the keyword engine extracting keywords from the first source information and from each of the second sources information in a manner employing knowledge management including knowledge management services or a semantic lexicon tool, such that, for each extracted keyword, the extracted keyword is related to the first source information and at least one second source information, the keyword engine producing respective groupings of second source information related by keyword and resulting in precise keywords that enhance retrieval of second sources of information, and for each extracted keyword, the knowledge management automatically records semantic relationships between the extracted keyword and its respective set of second sources, wherein the keyword engine extracting keywords includes:

extracting initial keywords from the first source;

forming an initial taxonomy from the extracted initial keywords;

detecting in the second sources words that match the initial taxonomy but that do not duplicate the extracted initial keywords of the first source; and combining the extracted initial keywords from the first source and the detected words from the second sources, said combining forming the listing of keyword; and an output member coupled to the keyword engine to receive the extracted keywords, the output member executed by a computer and in response to the received extracted keywords and automatically recorded semantic relationships thereof, displaying to a user a listing of the received extracted keywords in a manner enabling the user to navigate the one or more second sources of information, different keywords in the displayed listing referencing the different respective groupings of second source information and the different respective sets of second sources having subject matter of the first source of information shown to the user.

12. A system as claimed in claim 11 wherein the first source of information is any of:

a wiki, a blog, computer network printable content, written material in a computer, and text-like communications in a computer.

13. A system as claimed in claim 11 wherein each of the second sources of information is any of computer implemented: comments, responses, notes, and text-based messages.

14. A system as claimed in claim 11 wherein the displayed listing is any of a tag cloud, a taxonomy, and an ordered list.

15. A system as claimed in claim 14 wherein for each keyword in the displayed listing, the keyword is linked to its respective grouping of second source information and enables display of the respective grouping of second source information upon user selection of the keyword.

16. A system as claimed in claim 11 wherein the displayed listing of the keywords includes, for each keyword, an indication of number of second sources in the respective grouping of second source information of the keyword.

17. A system as claimed in claim 11 wherein:

the first source and the one or more second sources are from a collaborative application in a global computer network;

the keyword engine continually extracts keywords and forms dynamic groupings of second source information per keyword; and the output member updates the displayed listing in response to the keyword engine.

18. A computer program product as claimed in claim 1 wherein the first computer source of information is selected by the user.

* * * * *